United States Patent
Opsenica et al.

(10) Patent No.: US 11,632,714 B2
(45) Date of Patent: Apr. 18, 2023

(54) APPARATUS AND METHOD FOR ATTACHING USER EQUIPMENT TO A MOBILE COMMUNICATIONS NETWORK

(71) Applicant: Telefonaktiebolaget LM Ericsson (publ), Stockholm (SE)

(72) Inventors: Miljenko Opsenica, Espoo (FI); Jari Arkko, Kauniainen (FI); Heidi-Maria Back, Helsinki (FI); Tomas Mecklin, Kyrkslätt (FI); Le Wang, Helsinki (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 440 days.

(21) Appl. No.: 15/768,415

(22) PCT Filed: Oct. 15, 2015

(86) PCT No.: PCT/EP2015/073921
§ 371 (c)(1),
(2) Date: Apr. 13, 2018

(87) PCT Pub. No.: WO2017/063708
PCT Pub. Date: Apr. 20, 2017

(65) Prior Publication Data
US 2018/0310238 A1     Oct. 25, 2018

(51) Int. Cl.
*H04W 48/18* (2009.01)
*H04W 12/06* (2021.01)
(Continued)

(52) U.S. Cl.
CPC .......... *H04W 48/18* (2013.01); *H04W 12/06* (2013.01); *H04W 48/14* (2013.01); *H04W 72/042* (2013.01); *H04W 72/0413* (2013.01)

(58) Field of Classification Search
None
See application file for complete search history.

(56) References Cited

U.S. PATENT DOCUMENTS

| | | | |
|---|---|---|---|
| 10,271,362 B2* | 4/2019 | Nakano | H04W 84/00 |
| 10,602,438 B2* | 3/2020 | Ni | H04W 76/11 |
| 2013/0336210 A1 | 12/2013 | Connor et al. | |
| 2014/0086177 A1* | 3/2014 | Adjakple | H04W 12/08 370/329 |

(Continued)

FOREIGN PATENT DOCUMENTS

| | | | | |
|---|---|---|---|---|
| CN | 106375987 A | * | 2/2017 | ............ H04W 40/24 |
| WO | 2011/016947 A2 | | 2/2011 | |

OTHER PUBLICATIONS

Zong, Machine-translated CN106375987A, Feb. 2017, Machine-Translated on Jul. 15, 2020 via European Patent Office website. (Year: 2017).*

(Continued)

*Primary Examiner* — Ajit Patel
*Assistant Examiner* — Liem H. Nguyen
(74) *Attorney, Agent, or Firm* — Sage Patent Group

(57) ABSTRACT

A method in a user equipment for attaching the user equipment to a mobile communications network comprises receiving a list of network slice identities, wherein a network slice identity identifies a portion of the mobile communications network that serves as a logical network to a set of user equipment (step 201). A network slice is selected based on one or more criteria (step 203). A network slice attachment request is sent to a network node (step 205), for requesting attachment of the user equipment to the selected network slice of the mobile communications network.

15 Claims, 9 Drawing Sheets

(51) Int. Cl.
H04W 48/14 (2009.01)
H04W 72/04 (2009.01)

(56) References Cited

U.S. PATENT DOCUMENTS

| | | | |
|---|---|---|---|
| 2016/0353367 A1* | 12/2016 | Vrzic | H04W 28/0221 |
| 2017/0142591 A1* | 5/2017 | Vrzic | H04W 24/02 |
| 2017/0257886 A1* | 9/2017 | Adjakple | H04W 74/04 |
| 2018/0199278 A1* | 7/2018 | Duan | H04W 36/165 |
| 2018/0206152 A1* | 7/2018 | Zhang | H04W 4/24 |
| 2019/0007899 A1* | 1/2019 | Vrzic | H04W 16/10 |
| 2019/0021047 A1* | 1/2019 | Zong | H04W 76/11 |
| 2020/0267638 A1* | 8/2020 | Ni | H04L 63/0876 |

OTHER PUBLICATIONS

International Search Report and Written Opinion dated Jun. 16, 2016 issued in International Patent Application No. PCT/EP2015/073921. (13 pages).

NGMN Alliance, "5G White Paper", Feb. 17, 2015. (125 pages).

B. Aboba et al., "Extensible Authentication Protocol (EAP)," Network Working Group, Request for Comments (RFC) 3748, Jun. 2004. (67 pages).

* cited by examiner

APPARATUS AND METHOD FOR ATTACHING USER EQUIPMENT TO A MOBILE COMMUNICATIONS NETWORK

CROSS REFERENCE TO RELATED APPLICATION(S)

This application is a 35 U.S.C. § 371 National Stage of International Patent Application No. PCT/EP2015/073921, filed Oct. 15, 2015, designating the United States. The above identified application is incorporated by reference.

TECHNICAL FIELD

The present disclosure relates to an apparatus and method for attaching user equipment to a mobile communications network, and in particular to an apparatus and method for attaching a user equipment to a network slice of a mobile communications network.

BACKGROUND

In existing mobile networks a user equipment (UE) is attached to a home network provider independently of traffic type or subscribed services. The same is valid in a roaming scenario when only a preferred visited network is used.

There is a trend of a growing number of virtual network providers and Over-the-top (OTT) service providers. Such providers are focused either to specific sets of services or certain types of users. Examples of such service can be Skype™, Netflix™, Hulu™, Facebook™, Youtube™, Google Hangouts™, WhatsApp™, and so on.

As the mobile networks are being virtualized, there is a vision that the future core networks can be split in a similar fashion to how cloud-based web services are deployed today. With such a vision several mobile network operators or mobile virtual network operators can share the same infrastructure, and run their isolated network slices using that infrastructure.

For example, a paper by the next generation mobile network (NGMN) alliance, entitled the "5G White Paper", version 1.0, 17 Feb. 2015, discusses more about slicing and new business models. The new Application Programming Interfaces (APIs) exposed by the infrastructure will allow third parties (for example mobile virtual network operators, MVNOs, and verticals) to create and manage their own network slices.

In the future network all of those network and service providers are supposed to contribute to the global ecosystem. However, at present there is no mechanism for enabling end users to access the services provided by network slices.

Currently UEs attach to a network based on information stored on a Subscriber Identity Module (SIM) contained in the UE, as illustrated in FIG. 1. A user is typically exposed to the default network operator and related fixed set of services. In FIG. 1 a UE is shown as being exposed, for example, to a Long Term Evolution (LTE) network, a 2G/3G Radio Access Network (RAN), a Circuit Switched (CS) core network, a User Data Management (UDM) network, an Evolved Packet Core (EPC) network, and an IP Multimedia Subsystem (IMS).

With a growing number of network instances and virtual operators there is also a growing number of exposed services. Moreover, there is growing number of UE types using various non-SIM based identities and non-SIM authentication models. From that respect, existing network solutions do not provide flexible discovery of particular network instances or services in such a fragmented world.

A growing number of services relate to numerous ways of service consumption whereby a UE can be very interested to influence when, how or where a service is used, and to obtain higher Quality of Experience (QoE).

At present a virtual operator intending to provide mobile network connectivity to users has to comply with the SIM authentication model. It is not possible, for instance, to provide services based on credit card payments.

Flexible and extensible authentication protocols exist, such as Extensible Authentication Protocol (EAP). However, they are not part of the existing mobile network attachment procedure. Furthermore, even if they were, EAP's extensibility is limited to the selection of an authentication method. It does not support the use case where a user is paying by a credit card, filling in registration forms, or other free-form interaction.

In existing solutions there are, as mentioned earlier, over-the-top (OTT) services. These services can be freely chosen by the users. However, an OTT provider can provide only best effort QoE without the governance of reserved network resources.

SUMMARY

It is an aim of the embodiments described herein to provide a method and apparatus which obviate or reduce at least one or more of the disadvantages mentioned above.

According to a first aspect there is provided a method in a user equipment for attaching the user equipment to a mobile communications network. The method comprises receiving a list of network slice identities, wherein a network slice identity identifies a portion of the mobile communications network that serves as a logical network for a set of user equipment. A network slice is selected based on one or more criteria, and a network slice attachment request sent to a network node, for requesting attachment of the user equipment to the selected network slice of the mobile communications network.

According to another aspect there is provided a method in a network node for attaching a user equipment to a mobile communications network. The method comprises advertising a list of network slice identities, wherein each network slice identity identifies a portion of the mobile communications network that can serve as a logical network for a set of user equipment. A network slice attachment request is received from a user equipment, requesting attachment of the user equipment to a selected network slice of the mobile communications network. If attachment to the network slice is granted, the user equipment is informed of an initial access point where the user equipment can make an initial attachment directly to the network.

According to another aspect, there is provided a user equipment for attaching to a mobile communications network. The user equipment is adapted to receive a list of network slice identities, wherein a network slice identity identifies a portion of the mobile communications network that serves as a logical network for a set of user equipment. The user equipment is adapted to select a network slice based on one or more criteria, and send a network slice attachment request to a network node, for requesting attachment of the user equipment to the selected network slice of the mobile communications network.

According to another aspect, there is provided a network node for attaching a user equipment to a mobile communications network. The network node is adapted to advertise a list of network slice identities, wherein each network slice identity identifies a portion of the mobile communications network that can serve as a logical network for a set of user equipment. The network node is adapted to receive a network slice attachment request from a user equipment, requesting attachment of the user equipment to a selected network slice of the mobile communications network. If attachment to the network slice is granted, the network node is adapted to inform the user equipment of an initial access point where the user equipment can make an initial attachment directly to the network.

BRIEF DESCRIPTION OF THE DRAWINGS

For a better understanding of examples of the present invention, and to show more clearly how the examples may be carried into effect, reference will now be made, by way of example only, to the following drawings in which.

DETAILED DESCRIPTION

Although in the description below the term user equipment (UE) is used, it should be understood by the skilled in the art that "UE" is a non-limiting term comprising any mobile device, communication device, wireless communication device, terminal device or node equipped with a radio interface allowing for at least one of: transmitting signals in uplink (UL) and receiving and/or measuring signals in downlink (DL). A UE herein may comprise a UE (in its general sense) capable of operating or at least performing measurements in one or more frequencies, carrier frequencies, component carriers or frequency bands. It may be a "UE" operating in single- or multi-radio access technology (RAT) or multi-standard mode. As well as "UE", the general terms "terminal device", "communication device" and "wireless communication device" are used in the following description, and it will be appreciated that such a device may or may not be 'mobile' in the sense that it is carried by a user. Instead, the term "terminal device" (and the alternative general terms set out above) encompasses any device that is capable of communicating with communication networks that operate according to one or more mobile communication standards, such as the Global System for Mobile communications, GSM, UMTS, Long-Term Evolution, LTE, etc.

A UE may comprise a Universal Subscription Identity Module (USIM) on a smart-card or implemented directly in the UE, e.g., as software or as an integrated circuit. The operations described herein may be partly or fully implemented in the USIM or outside of the USIM.

The term "network slice" as used in the embodiments below, defines a portion of a mobile communication network that comprises a set of all the required network resources which are configured together as a logical network that is used to serve a defined business purpose or customer. A network slice may therefore comprise a logical network that forms part of a physical network. A network slice may therefore comprise a portion of a mobile communications network that serves as a logical network for a set of user equipment.

Thus, using network slices, several mobile network operators or mobile virtual network operators can share the same infrastructure, and run their isolated network slices using that infrastructure. A network slice type can relate, for example, to a service type, a user equipment type, a business network isolation reason, or some other business criteria. Examples of business network isolation reasons can include, for example: operator based isolation (e.g. telecommunications operator or Internet-of-Things operator); functionality based isolation (e.g. performance related, such as Round Trip Time, RTT, or non-SIM based security, etc); Network-as-a-Service, NaaS, isolation around service; operational (selective software upgrade, security, and so on).

Figure 1:
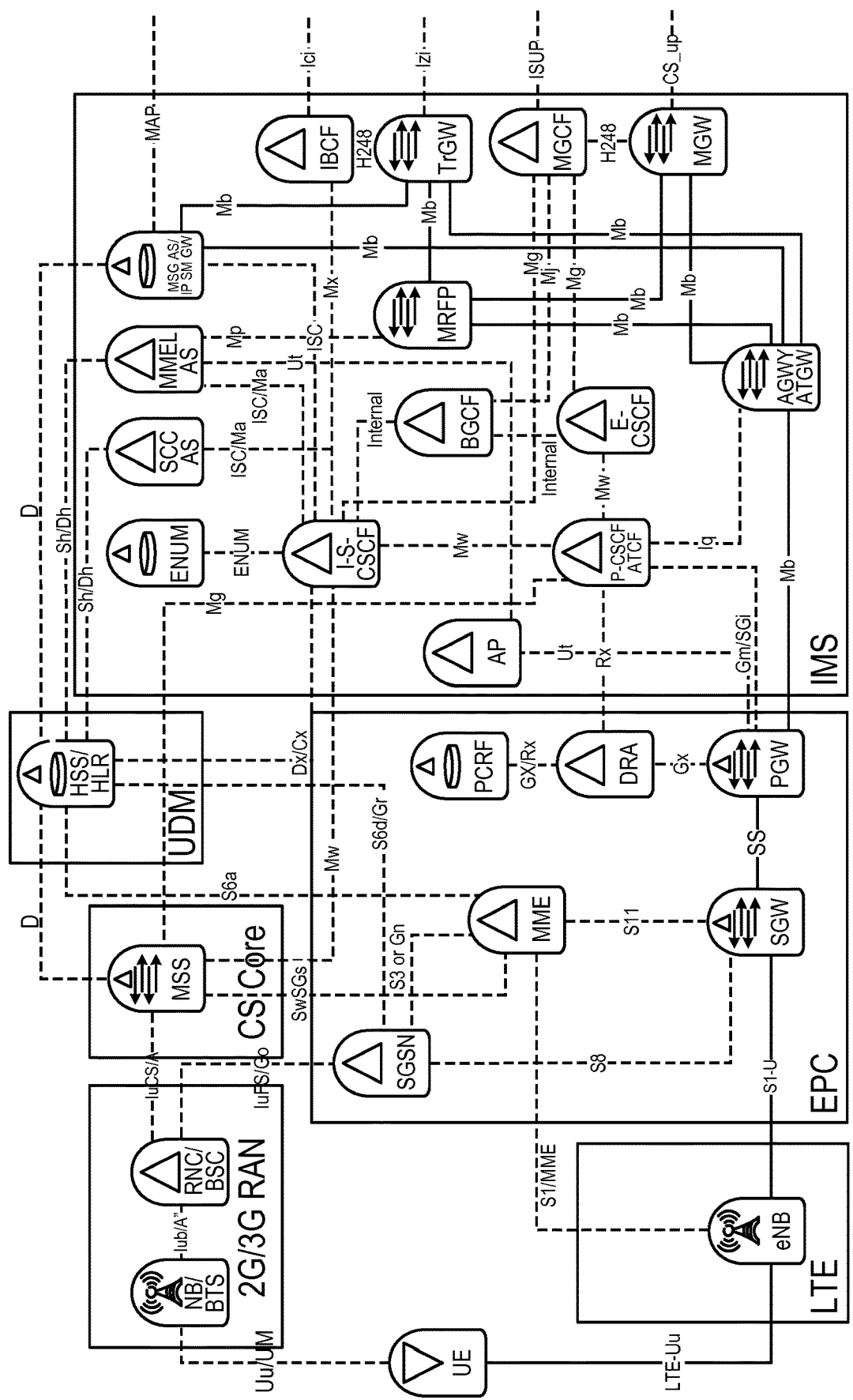
FIG. 1 shows an example of various networks accessible by a user equipment.
Figure 2:
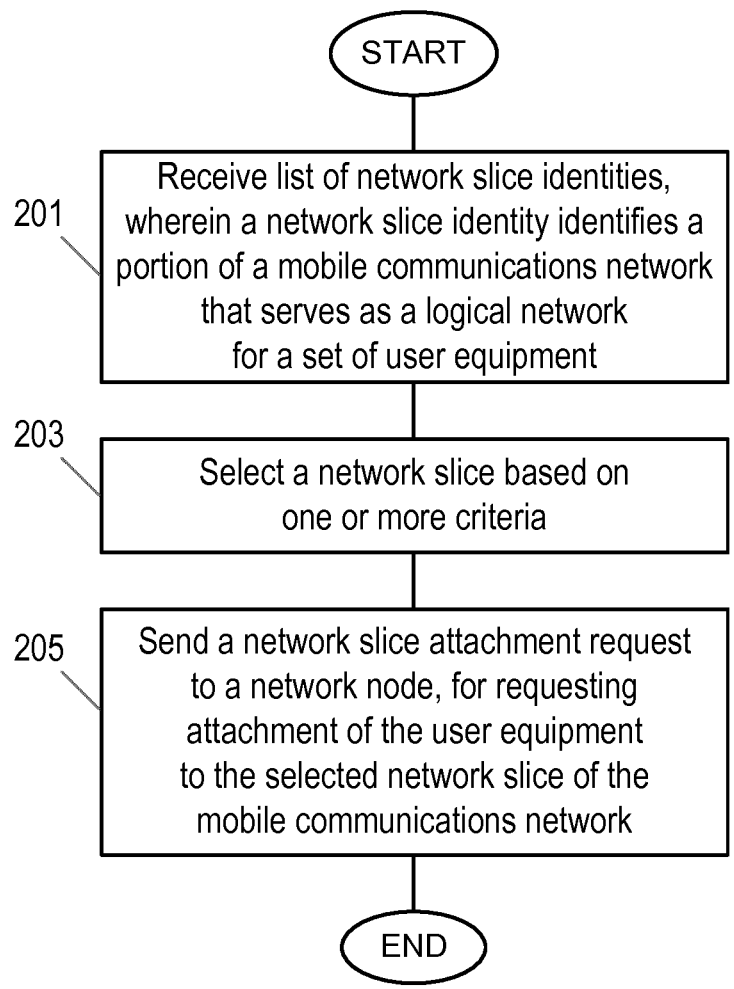
FIG. 2 shows an example of a method in a user equipment according to an embodiment.

FIG. 2 shows an example of a method in a user equipment according to an embodiment, for attaching the user equipment to a mobile communications network. The method comprises receiving a list of network slice identities, wherein a network slice identity identifies a portion of the mobile communications network that serves as a logical network for a set of user equipment, step 201. In step 203, a network slice is selected based on one or more criteria. A network slice attachment request is sent to a network node, step 205, for requesting attachment of the user equipment to the selected network slice of the mobile communications network.

By receiving a list of network slice identities, this enables a user equipment to attach or anchor to the mobile communications network, since it enables the user equipment itself to select which network slice it wishes to anchor to.

In some embodiments the step of receiving a list of network slice identities further comprises receiving network slice capabilities tags associated with respective network slice identities, wherein a network slice capability tag relates to the functional capabilities of the associated portion of the mobile communications network.

By receiving a network slice capability tag, this enables the user equipment to make a more refined selection about which network slice to use.

The step of selecting based on one or more criteria may comprise using any one or more criteria, including but not limited to: a user preference; a network slice type preferred by a mobile network operator, MNO, for a particular service or application to be used by the user equipment; a network slice type preferred by a mobile network operator, MNO, for one or more services or applications to which the user equipment is subscribed; a network slice type preferred by a mobile virtual network operator, MVNO, for a particular service or application to be used by the user equipment; a network slice type preferred by a mobile virtual network operator, MVNO, for one or more services or applications to which the user equipment is subscribed; or a degree of correlation between the capabilities of an application or service to be used by the user equipment and the capabilities of the network slice of the network. Other criteria may also be used to determine which network slice is to be selected.

In some embodiments the step of selecting a network slice comprises selecting a network slice using an anchoring application running on the user equipment. The anchoring application may be preloaded onto the user equipment, or loaded onto the user equipment by a user of the user equipment.

The method may comprise the step of pre-registering the user equipment with a network node using the anchoring application. Such pre-registration may be performed, for example, to inform the network node that the user equipment wishes to receive a list of network slice identities.

In some embodiments the method may further comprise the step of performing an authentication procedure through the selected network slice. As will be described later in the application, such an authentication can enable either SIM based or non-SIM based authentication to be performed.

Once a network slice has been selected, subsequent traffic may then be routed through the selected network slice.

In some examples, the method may involve attaching one or more other applications or services to the selected network slice, either by request of the user equipment and/or request of a mobile network operator or mobile virtual network operator. This may involve associating a secondary network slice with the network slice that has been initially selected (also referred to herein as the "base" network slice).

The list of network slice identities may be received from a network node, for example a base station or eNB.

Figure 3:
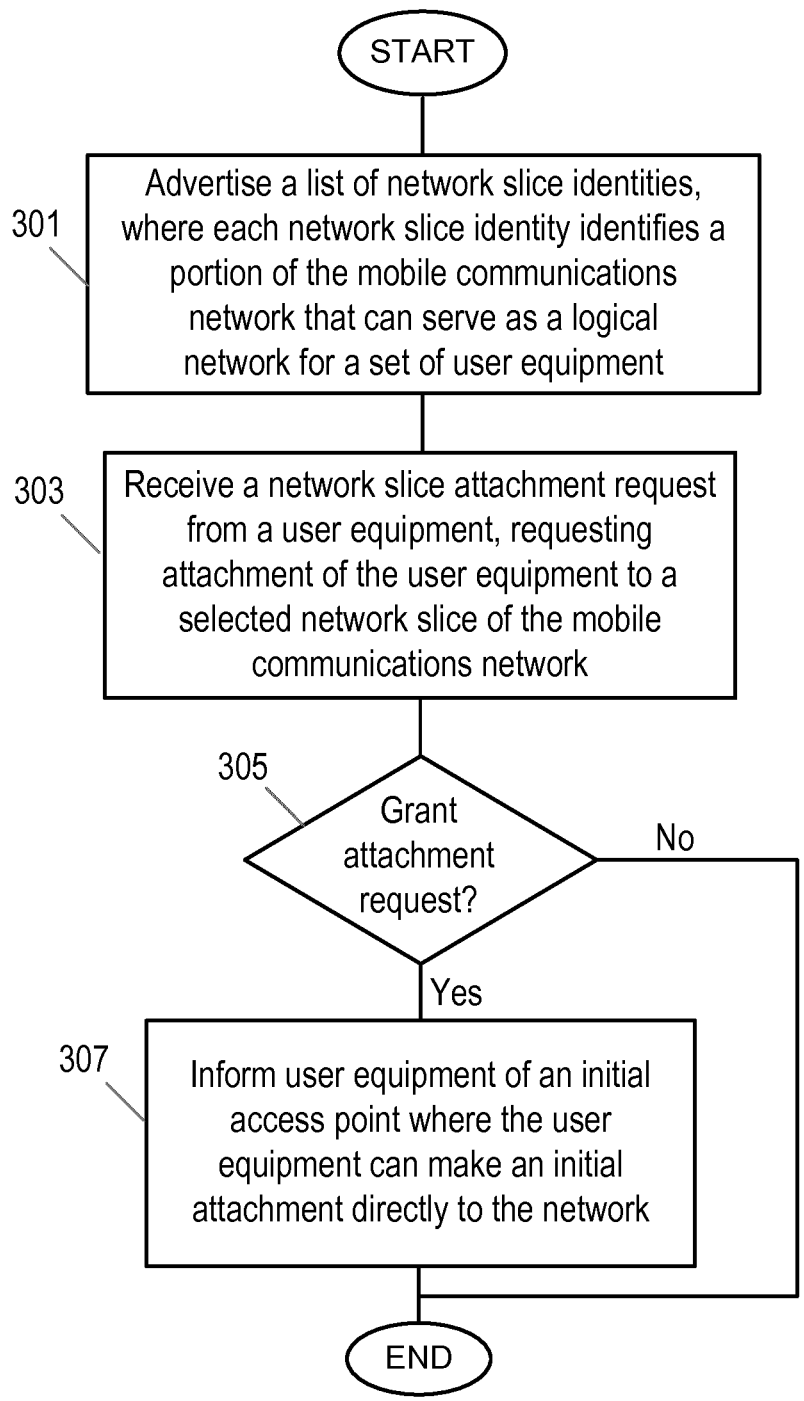
FIG. 3 shows an example of a method in a network node according to an embodiment.

FIG. 3 shows an example of a method in a network node according to an embodiment, for attaching a user equipment to a mobile communications network. The method comprises advertising a list of network slice identities, step 301, wherein each network slice identity identifies a portion of the mobile communications network that can serve as a logical network for a set of user equipment. The method comprises receiving, step 303, a network slice attachment request from a user equipment, requesting attachment of the user equipment to a selected network slice of the mobile communications network. In step 305 it is determined whether to grant attachment of the user equipment to the network slice. If granted, in step 307 the method comprises informing the user equipment of an initial access point where the user equipment can make an initial attachment directly to the network.

A network slice may have knowledge of how to identify a UE when deciding whether to grant attachment of a UE to a network slice (e.g. identity management functionality). Alternatively, a network slice may use some form of external entity to identify a UE, such as a Home Subscriber Server (HSS) node used in existing networks, or an Authentication Authorization and Accounting (AAA) node, or any other service specific entity in charge of identity management function(s).

In one embodiment, prior to the step of receiving a network slice attachment request, the method comprises receiving a request from a user equipment to register with a mobile network operator, MNO, or virtual mobile network operator, MVNO, and assigning a global unique user equipment identity, GUID, to the user equipment, and a default network slice identity of a network slice that the user equipment can use.

Prior to the step of advertising a list of network slice identities, the method may further comprise retrieving from a database a list of network slices available in the mobile communications network, and the corresponding network slice identities of the available network instances.

In some embodiments the method further comprises the steps of obtaining a temporary identity relating to the user equipment, and an authentication access point to be used by the user equipment for initial access to the mobile communications network, and sending the temporary identity and authentication access point to the user equipment.

The embodiments described herein enable selection of a mobile network service (or slice of a network) independently of who owns the network infrastructure or what authentication method or identity is used to identify the user or the UE. This allows applications such as application-based subscription services to be provided, for example where an application in a phone can offer various connectivity options and subscriptions. For instance, a network slice can offer credit-card paid subscription that generates a virtual SIM card upon the first selection of that network slice.

The embodiments described herein differ from existing SIM-card based mechanisms, as they allow earlier negotiation of a network service slice that may or may not require a SIM card. The solutions provided by the present embodiments also differ from existing Access Point Name (APN-name) mechanisms in that the entire upper-layer network functionality may be selected by the choice of a network slice, and not merely the routing of the packets beyond the Gateway GPRS Support Node (GGSN), as in the APN-name mechanisms.

Some embodiments described herein provide an interface to network service providers by using a dedicated network slice anchoring application that communicates with a back-end anchoring gateway (GW). The embodiments envisage a Mobile Network Service owner advertising its own network slice in a similar manner as today's WIFI networks. By doing this, a user can obtain information on network slice capabilities, their availability, and to easily select and attach to a preferred network slice. All subsequent traffic may then be routed to/from a network slice in the network belonging to the selected Mobile Network Service.

The proposed embodiments can help boost application/service ecosystem agreements where an MNO/MVNO operator can provide network slice resources to third party application/service providers (for example whereby a CNN channel is provided in a Facebook network slice).

Further details of various embodiments will now be made with reference to the example of FIG. 4, which provides further information relating to UE network slice selection and anchoring.

Figure 4:
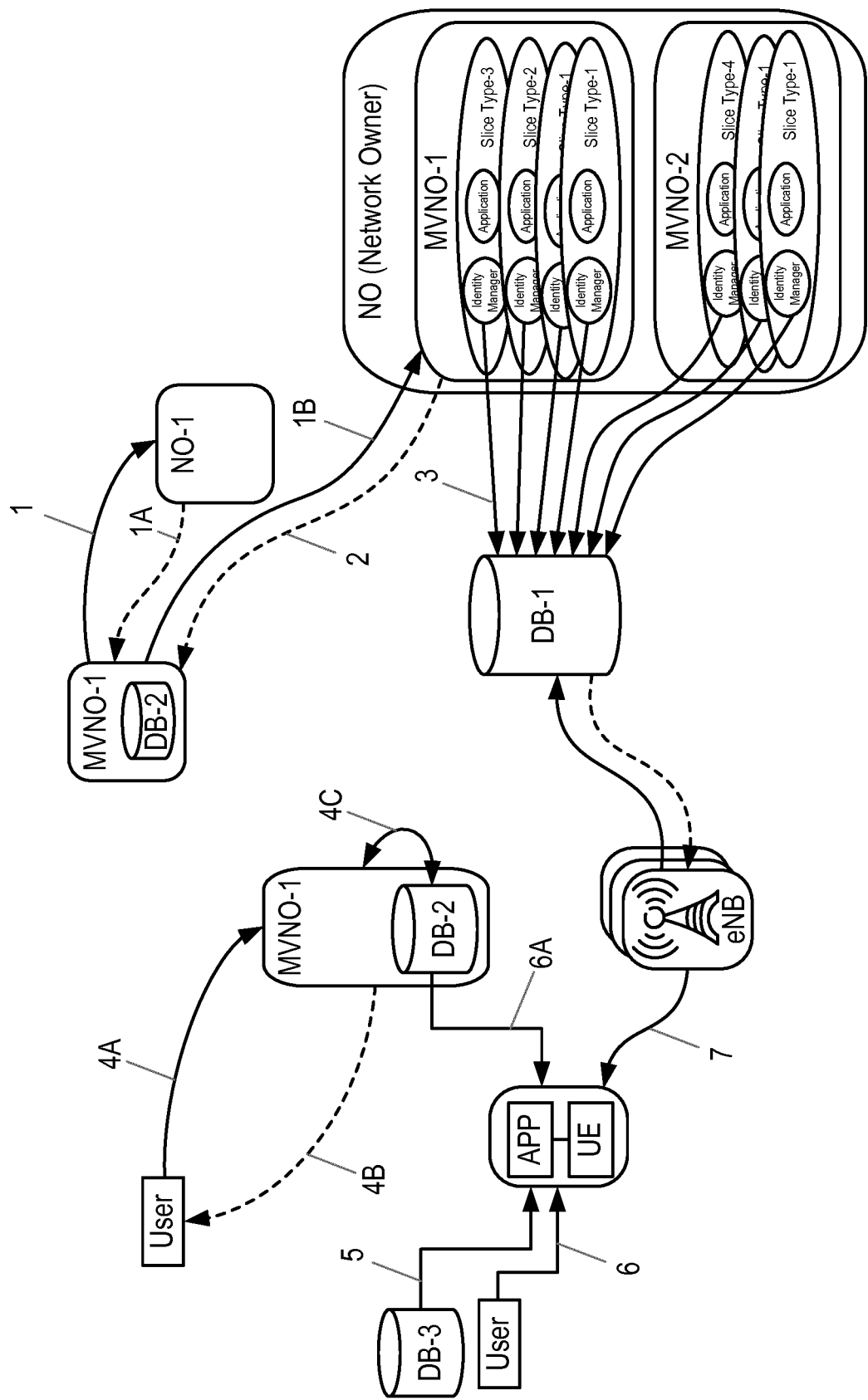
FIG. 4 shows an example of network slice advertising to a user equipment, according to an embodiment.

In an embodiment, a network operator (NO) and a mobile virtual network operator (MVNO) may make an agreement on network partition sharing, where a MVNO's network slices can be created, for example illustrated as steps 1 and 1A in FIG. 4, between the NO and MVNO. A network slice may be created utilizing infrastructure interfaces exposed by the infrastructure owner, who is the NO in this example. The MVNO creates the network slice with requested service functionality. One network slice, among other functionality, contains an identity management function and an application, e.g. a Facebook network slice, illustrated as step 1B which provides slice orchestration and step 2 which provides network slice identity assigned by the NO.

When the network slice is created, it registers itself to a database, such as DB-1 in FIG. 4, which may be owned by the access/infrastructure owner (illustrated as step 3 in FIG. 4). Registration may include providing a network slice identity and network slice initial access point (e.g. identity management access point). The network slice identity holds information about the MVNO (e.g. Public Land Mobile Network Identity, PLMN-ID) and network slice type identity (e.g. SLI: Slice type identity). Registration can also include providing network slice capability tags that can be used in a network slice selection procedure. The network slice identity is also received back by the MVNO and stored to the internal MVNO database (e.g. database DB-2, step 2 in FIG. 4). Network slice information may be updated according to any network slice resource changes (e.g. network slice updates or decommissioning).

When a user signs up to a MVNO, the UE gets a unique identity, for example a Globally Unique UE Identity (GUID) and the default network slice identity of the network instance (slice) that the UE can use (shown as steps 4A and 4B in FIG. 4). A GUID identity is more generic and can support SIM and non-SIM based identities. It is noted that a network slice identity can reflect more about network slice type, and it is not necessary globally unique since a MVNO could also have multiple network slices of the same type. A MVNO can update a user later on with an additional list of preferred network slice identities (shown as step 6A in FIG. 4). The GUID and network slice identity mapping may be stored in the database of the MVNO, shown as database DB-2 of MVNO-1, and step 4C in FIG. 4.

In a next step, a user can obtain an MVNO related UE Anchoring Application (UE-A-App), e.g. Facebook application. A US anchoring application (UE-A-App) can be either preloaded to the UE or uploaded by the MVNO using a non-slice specific connection, e.g. WiFi, USB, (shown as step 5 in FIG. 4). In this example the anchoring application is shown as being uploaded from a database DB-3.

After the anchoring application has been loaded to the UE, the user can register itself and configure the anchoring application (UE-A-App), shown as step 6 in FIG. 4. The anchoring application (UE-A-App) is configured, among other information, with GUID and preferred network slice(s). Once the UE tries to attach to the network, the access network (e.g. eNB) starts advertising towards the UE the available network slices (shown as step 7 in FIG. 4).

Figure 5:
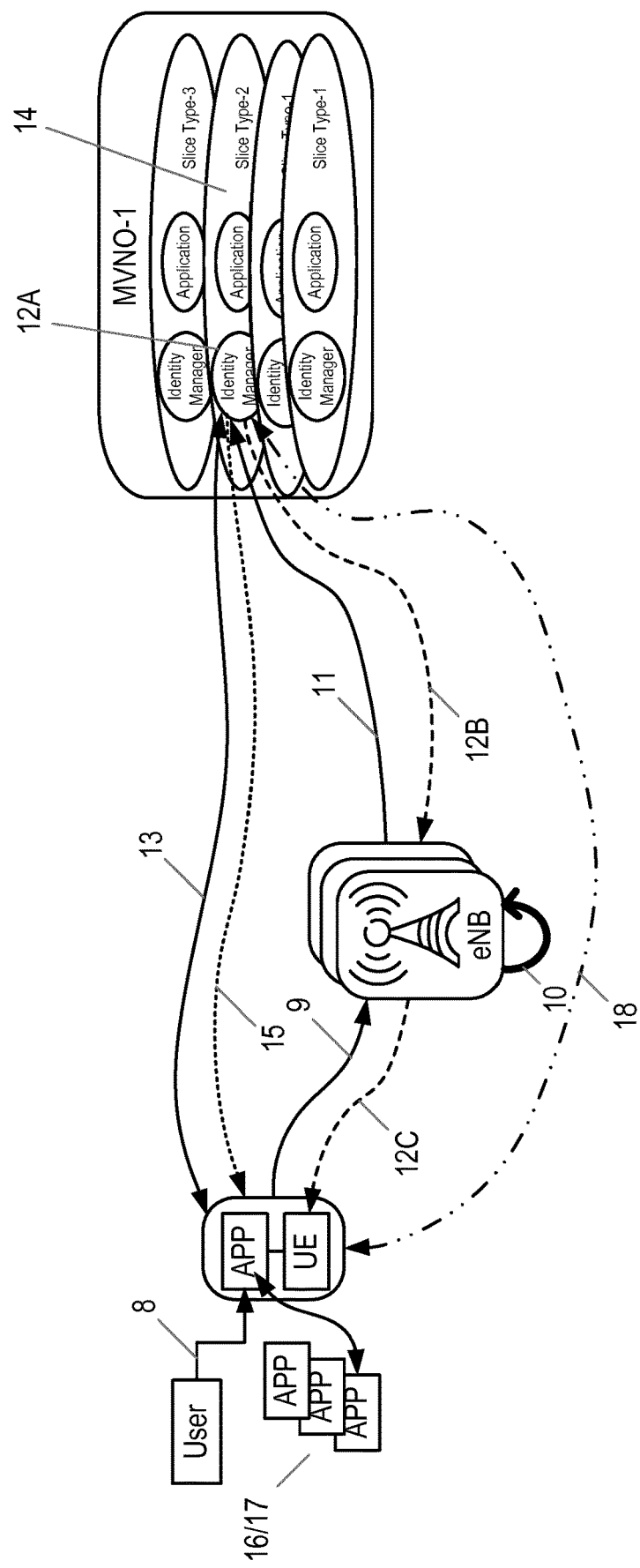
FIG. 5 shows an example of network slice selection by a user equipment, according to an embodiment.

Referring to FIG. 5, further details will now be provided about examples of how a UE can select a network slice using the anchoring application (UE-A-App).

Available network slices can be provided by multiple MVNOs. In addition, one MVNO can provide multiple network slices, or different types and/or the same type. A network node, such as a eNB, can obtain or learn a list of available network instances (or network slices) from a database, for example database DB-1 referred to above in FIG. 4. In the following step, a list of available network instances or network slices is provided to the UE, for example to the anchoring application (UE-A-App) of the UE. The network instances or network slices are represented with a network slice identity, and in some embodiments also with a network slice capabilities tag. The user equipment, using the anchoring application (UE-A-App), selects a network slice using some selection criteria. The selection criteria can include different inputs, for example, UE-A-App requirements and preferences, MVNO preferences, user preferences, UE capabilities, advertised network instance' type and capabilities (as shown in step 8 in FIG. 5). The anchoring application (UE-A-App) therefore selects a slice identity of a selected network slice.

Next, the UE attachment to the network slice will be described further. Once a user selects a network slice by matching selected criteria, the user tries to attach to the selected network slice with the selected slice identity (shown as step 9 in FIG. 5). A Attach Request message may contain the identity of the UE (e.g. GUID) and the slice identity (e.g. <PLMN-ID><SLI>). Slice identity here is an additional input for the existing protocols or standards. The Attach Request is then processed by the base station (eNB), where it gets forwarded to the correct MVNO and related network slice (shown respectively as steps 10 and 11 in the example of FIG. 5, step 10 being the selection of a network slice with requested identity, and step 11 the sending of the Attach Request to the MVNO).

In step 12A of FIG. 5, the MVNO, from the selected network slice, identifies the UE and sends back a network generated temporary identity (e.g. <GUTI>=<PLMN-ID><IDMI><USI>; IDMI=Identity Manager Identity; USI=UE Subscriber Identity) together with the network slice initial access point, shown as step 12B in FIG. 5). A network slice initial access point, according to this example, comprises the identity of a management access point. A response is forwarded all the way to the UE (shown as step 12C in FIG. 5).

In the case where there are no network slices with MVNO governance (owned by MVNO), the MVNO can also make an agreement with another MVNO on a sharing agreement (e.g. Facebook UEs using a Google network slice). An agreement can define how a UE is identified and authenticated in that case.

When the UE receives the temporary identity (GUTI) it can proceed with the authentication steps. Authentication can be service or network slice or MVNO specific (step 13 of FIG. 5 showing the Authentication Request, which may also include security information). The authentication step can appear on the UE side in the form of an additional window to input security information. This process may include, for instance, bringing up web-based login screens or other mechanisms where the user has to enter information, such as credit card numbers. Security information together with the UE temporary identity is sent in the Authentication Request towards the network slice access point. A UE gets authenticated in the network slice (shown as step 14 in FIG. 5, illustrating how a network slice authenticates a UE and provides an application anchoring point).

It will be appreciated that the details surrounding how the authentication per se is performed, and how an application access point is selected, are outside the scope of the present application. A response is sent all the way back to the UE with a network slice application anchoring point (shown as step 15 in FIG. 5). The network slice application anchoring point is an access point for all further application specific traffic (e.g. application specific access GW).

Next, there will be described how the anchoring application (UE-A-App) and anchoring point may be used to boost an application ecosystem. The UE anchoring application (UE-A-App) can provide a connected network slice for all the corresponding UE applications (shown as steps 16-17 in FIG. 5). For instance, if a UE joins the Facebook network slice, the Facebook UE-A-App can share the same network slice application anchor to another related application such as a CNN news channel application. That way, a related application (e.g. CNN channel) can anchor to the same network slice (instance) and access the connected CNN channel application. All related applications can start using a connected network instance (or slice) for their own traffic (shown as step 18 in FIG. 3). The solution of this particular embodiment can boost application/service ecosystem agreements where an MVNO operator (e.g. Facebook) can provide network slice resources to a third party application/service (e.g. CNN channel). The proposed application/ service ecosystem can bring business benefits to the service providers, to the MVNOs and also to the network/infrastructure providers. Further details are provided later in connection with FIG. 7.

From the above it can be seem that embodiments of the invention provide network slice advertising, by providing network slice identity (and network slice capabilities) directly to the UE. That way, a UE can use the received advertised list of network slice identities as an input, together with other preferences, such as its own preferences (including MVNO and UE-A-App preferences) and application requirements to directly select a network slice of the UE's own choice, as depicted in the sequence diagram in the example of FIG. 6, as described below.

Figure 6:
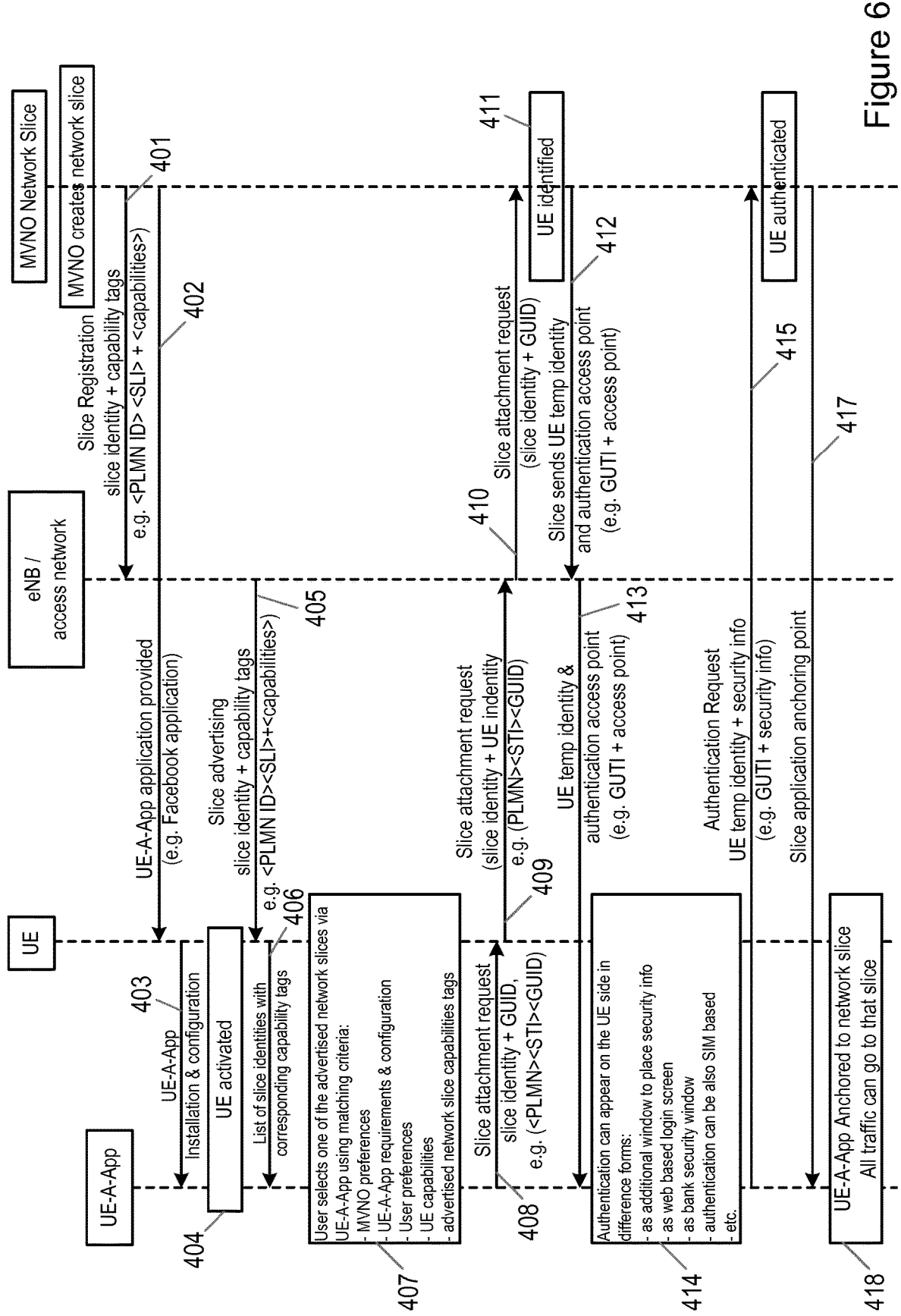
FIG. 6 shows an example of a sequence diagram relating to network slice advertising to a user equipment, according to an embodiment.

FIG. 6 shows an example of a sequence diagram relating to network slice advertising to a user equipment, according to an embodiment.

It is assumed that a plurality of network slices have been created. Stage 401 represents a slice registration procedure, whereby network slice identities and associated capability tags are sent from the MVNO to a network node, such as an eNB or access network. Stages 402 and 403 illustrate how a UE can download an anchoring application (UE-A-App), for example from the MVNO. Once installed the UE becomes activated, as illustrated by stage 404.

Stage 405 shows the UE receiving the network slice advertising, which comprises a list of network slice identities. In some examples this also comprises receiving capability tags associated with the network slices. Stage 406 shows how the anchoring application (UE-A-App) running on the UE uses this information to select a particular network slice. As shown in stage 407, the selection may utilize one or more criteria, including MVNO preferences, UE-A-App requirements and configurations, user preferences, UE capabilities, or advertised network slice capability tags.

Once a network slice has been selected, stages 408 and 409 show a network slice attachment request being sent from the UE to the network node. The attachment request may contain the identity of the selected network slice and the identity of the UE (for example a GUID). The slice attachment request may in turn be passed to the MVNO, stage 410, which enables the MVNO to identify the UE, stage 411. The eNB or access point then obtains a temporary UE identity from the MVNO (for example a GUTI) and an authentication access point to be used by the UE for performing the initial authentication, stage 412. The eNB or access network then sends this temporary UE identity (GUTI) and authentication access point to the UE, stage 413, for use by the anchoring application (UE-A-App) running on the UE.

The UE can then present an authentication procedure to the user of the UE, stage 414, for example displaying an authentication window for input of authentication information, providing a web-based login screen, a bank type of security window, a SIM based authentication, or some other form of procedure.

The anchoring application (UE-A-App) running on the UE then sends an authentication request to the MVNO, stage 415, containing the temporary identity of the UE and the security information input by the user. The MVNO can then perform an authentication procedure to authenticate the UE. The MVNO then sends a network slice application anchoring point to the anchoring application running on the UE, stage 417. Once this is received by the anchoring application running on the UE, the anchoring application anchors the UE to the network slice, stage 418, such that all traffic can then be routed to/from that network slice.

An example of how an anchoring application running on a UE (e.g. UE-A-App) is used to enable a UE controlled network slice selection and attachment to a network instance has thus been explained above. Once the anchoring application (UE-A-App) establishes an anchoring point to the selected network slice, according to some embodiments it can also share the network slice with other related third party services/applications used by the UE. That way, a UE is able to obtain direct access to a wider set of the third party applications/services.

The anchoring application (UE-A-App) enables a UE to establish an anchor to the base slice application through the proposed network attachment solution, as described above. A third party service provider can make an agreement with the base slice owner (MVNO), i.e. the owner of the initially selected network slice, and use a base slice to expose an own application. The third party application is exposed as a secondary slice and uses a base slice to connect to the defined set of UEs. The secondary network slice provides means for additional third party service and traffic separation. For instance, a second application, for example a CNN news channel application, can use a base slice relating to a first application, for example a Facebook base slice, to connect to Facebook UEs (depicted in FIG. 7 and FIG. 8). In that case the CNN channel application connects to the base slice in the form of secondary slice. The Facebook base slice is used more for UE attachment to the network and initial traffic separation while the secondary slice provides the CNN application itself.

As part of such an example agreement, a third party application ($3^{rd}$-UA-App) may be offered to the MVNO users (i.e. offered to the UEs). Assuming that the third party application ($3^{rd}$-UA-App) have been uploaded to the UE, and the anchoring application (UE-A-App) has established a base slice anchor, the anchor can be shared with the uploaded third party application ($3^{rd}$-UA-App). That way the third party application ($3^{rd}$-UA-App) uses an already established anchor to access a base network slice and from there access a corresponding secondary slice with the third party application (depicted in FIG. 7 and FIG. 8).

Figure 7:
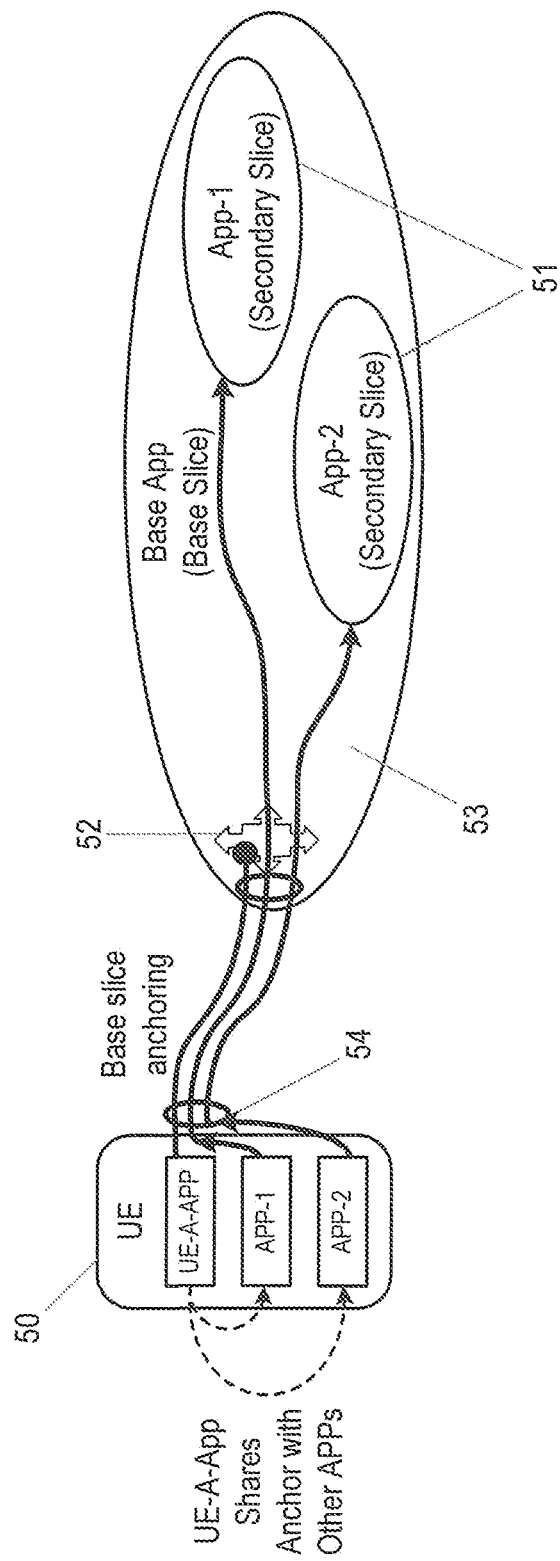
FIG. 7 shows an example of a user equipment anchoring application being used to share an anchoring point to a network slice, according to an embodiment.

In FIG. 7 there is shown an anchoring application (UE-A-App) running on a UE 50, which shares an application running on an anchor network slice, e.g. APP-1 with a second application, e.g. APP-2, running on a secondary network slice. The base slice 53 holds the base application and enables a slice application anchor to related applications (e.g. CNN channel APP). The secondary slice 51 uses a base network slice to connect to the defined set of UEs (e.g. CNN channel APP). Reference 52 represents a base slice application anchoring point, with reference 54 showing how a base slice anchor is used by other APPs.

Figure 8:
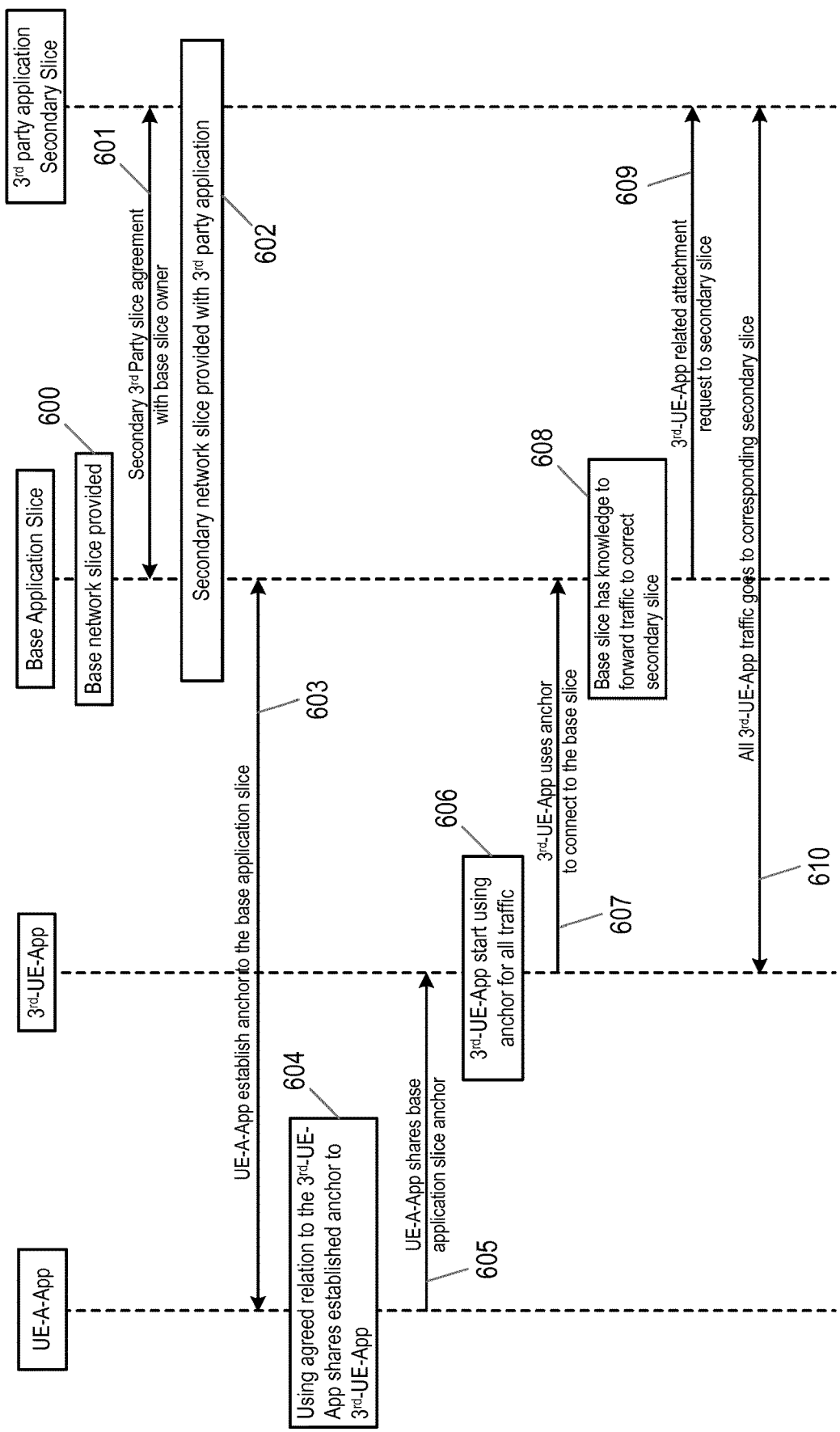
FIG. 8 shows an example of a sequence diagram relating to a user equipment anchoring application being used to share an anchoring point.

A sequence diagram for an anchoring application (UE-A-App) having a shared application anchor solution is depicted in FIG. 8. Stage 600 shows a base network slice being provided (for example having been established as described above in FIG. 6). Stage 601 shows a secondary agreement being established between a third party and the base slice owner. In stage 602 a secondary network slice is provided with a third party application.

In stage 603 an anchoring application running on a UE (UE-A-App) establishes an anchor to the base application slice. In stage 604, using an agreed relation to the third party application ($3^{rd}$-UE-App), the anchoring application (UE-A-App) shares the established anchor with the third party application ($3^{rd}$-UE-App), shown as stage 605.

In stage 606 the third party application ($3^{rd}$-UE-App) starts using the anchor for all traffic. In stage 607 the third party application ($3^{rd}$-UE-App) uses the anchor to connect to the base slice. As shown in stage 608, the base slice has knowledge to forward traffic to the correct secondary slice. This may comprise the third party application ($3^{rd}$-UE-App) making a related attachment request to the secondary slice, as shown in stage 609. Thereafter all third party application ($3^{rd}$-UE-App) traffic goes to the corresponding secondary slice, as shown in stage 610.

According to another embodiment, there is provided a user equipment for attaching to a mobile communications network. The user equipment is adapted to: receive a list of network slice identities, wherein a network slice identity identifies a portion of the mobile communications network that serves as a logical network for a set of user equipment; select a network slice based on one or more criteria; and send a network slice attachment request to a network node, for requesting attachment of the user equipment to the selected network slice of the mobile communications network.

According to another embodiment there is provided a network node for attaching a user equipment to a mobile communications network. The network node is adapted to: advertise a list of network slice identities, wherein each network slice identity identifies a portion of the mobile communications network that can serve as a logical network for a set of user equipment; receive a network slice attachment request from a user equipment, requesting attachment of the user equipment to a selected network slice of the mobile communications network; and, if attachment to the network slice is granted; inform the user equipment of an initial access point where the user equipment can make an initial attachment directly to the network.

Figure 9:
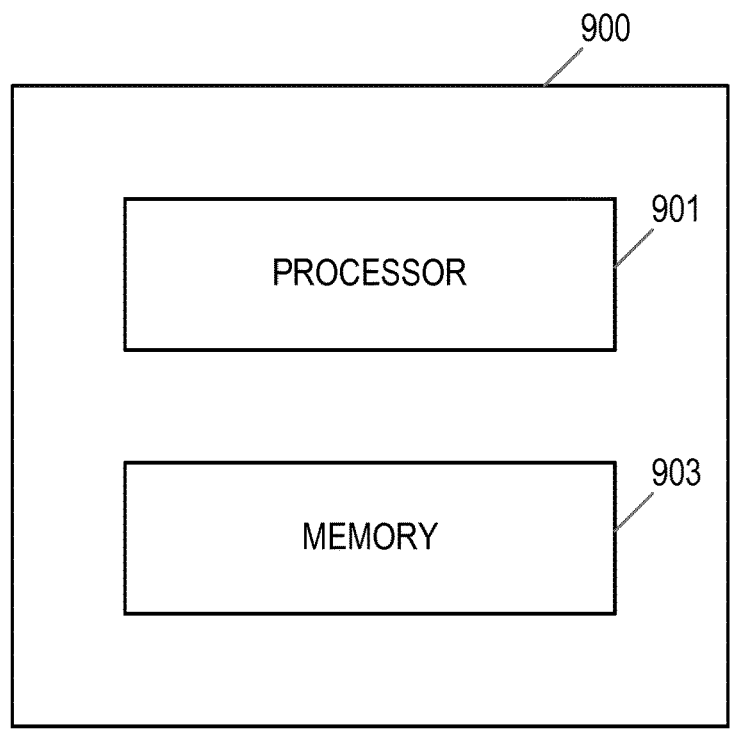
FIG. 9 shows an example of a user equipment according to an embodiment.

FIG. 9 shows an example of a user equipment 900 according to another embodiment, for attaching to a mobile communications network. The user equipment comprises a processor 901 and a memory 903, said memory 903 containing instructions executable by said processor 901. Said user equipment 900 is operative to: receive a list of network slice identities, wherein a network slice identity identifies a portion of the mobile communications network that serves as a logical network for a set of user equipment; select a network slice based on one or more criteria; and send a network slice attachment request to a network node, for requesting attachment of the user equipment to the selected network slice of the mobile communications network.

Figure 10:
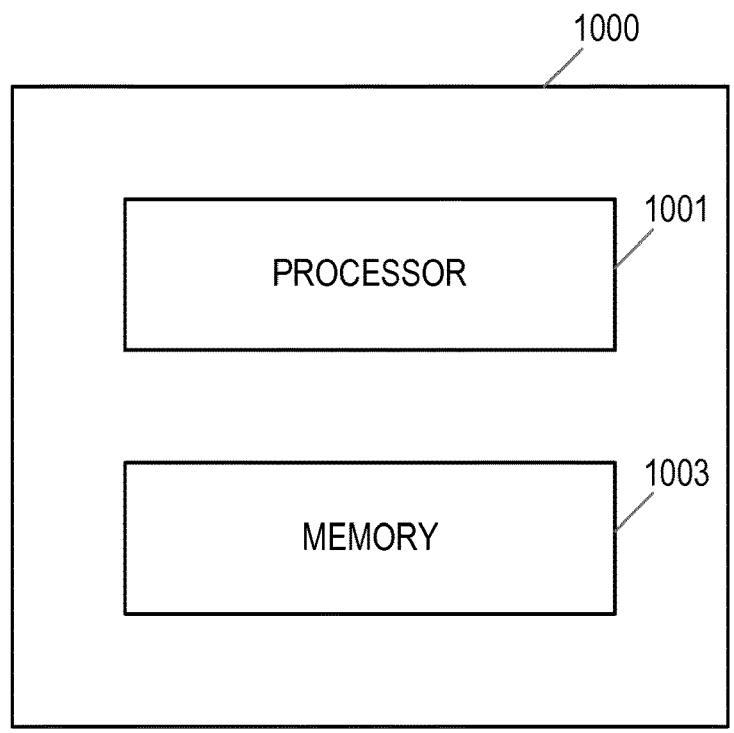
FIG. 10 shows an example of a network node according to an embodiment.

FIG. 10 shows an example of a network node 1000 for attaching a user equipment to a mobile communications network. The network node 1000 comprises a processor 1001 and a memory 1003, said memory 1003 containing instructions executable by said processor 1001. Said network node 1000 is operative to: advertise a list of network slice identities, wherein each network slice identity identifies a portion of the mobile communications network that can serve as a logical network for a set of user equipment; receive a network slice attachment request from a user equipment, requesting attachment of the user equipment to a selected network slice of the mobile communications network; and if attachment to the network slice is granted; inform the user equipment of an initial access point where the user equipment can make an initial attachment directly to the network.

From the embodiments described above it can be seen that information about network slices (instances) is provided directly to the UE. The information on network slices (instances) can have network slice identity but also in some embodiments capabilities tags. That way a UE can use its own selection criteria to choose a preferred network slice (or network instance).

The proposed solutions can provide a direct selection of Mobile Network Service (slice of network) independently of who owns the network infrastructure or what authentication method or identity is used to identify the user or the UE.

An anchoring application (UE-A-App) used in some embodiments enables a UE to make direct network instance attachment. Such an anchoring application (UE-A-App) can also enable a network anchoring point to related third party services/applications, and that way boost related application/service ecosystem.

The embodiments described above are based on a network slicing concept, where each MNO/MVNO can create and own a set of network slices. An application can be isolated (sliced) in a partition of a network. The slicing concept can use, for example, ETSI's Network Functions Virtualization (NFV) principles, or the principles mentioned in the NGMN 5G White Paper mentioned earlier, as a base reference.

Thus, in the embodiments described above, there is provided a method and apparatus for selection of a network slice (partition of network), for example using a UE controlled anchoring application.

A network slice represents a mobile network operator, MNO, or a mobile virtual network operator, MVNO, that serves as a logical network or function for a set of UEs. The network and the UE communicate by exchanging what slices the network supports. A UE can also obtain slice type(s) preferred by the MNO or MVNO for service(s) the UE is subscribed to, or services the UE wishes to use.

According to some examples, selection criteria can include user preferences, MVNO preferred slice types, application capabilities matching with slice capabilities. Once a selection is made, further traffic may then be routed through that particular slice.

In some embodiments the authentication of the user may be performed through that slice as well, allowing both SIM-card and other forms of authentication.

Mobile network service providers can advertise the availability and service capability in the form of a slice. Slices may be advertised via a base station (BS/eNB) entity. MVNOs can register slices' initial access points to an eNB related database (for example a database in the form of a DNS server). A slice initial access point is a connection point where a UE can make an initial attachment directly to that network instance. A UE can use a preloaded anchoring application to match slice selection criteria with network provided slices and select a slice of interest. The application can be preloaded to the UE device or loaded by user, e.g. from a MVNO storage server. An anchoring application can be used to handle connection to the selected slice, and also to link any other application(s) a user or MNO/MVNO wishes to connect to the same slice. A user can be identified and authenticated in the selected slice by using a MNO/MVNO specific identity that can be used to authenticate the user with the slice owner. The authentication provides a slice application specific access point to the UE. That access point can then be shared among other applications used by the UE. The applications using the access point can be linked with the UE anchoring application, for example through business agreement(s) with the MVNO. Third party service providers can share a network instance utilizing other agreements, for example mashup agreements, such that an application/service ecosystem is boosted. All subsequent traffic to a slice in the network belonging to the selected Mobile Network Service(s) is handled via the established connection.

The description above sets forth specific details, such as particular embodiments for purposes of explanation and not limitation. But it will be appreciated by one skilled in the art that other embodiments may be employed apart from these specific details. In some instances, detailed descriptions of well known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing units, one or more processing modules or one or more controllers, and the terms computer, processor, processing unit, processing module and controller may be employed interchangeably. When provided by a computer, processor, processing unit, processing module or controller, the functions may be provided by a single dedicated computer, processor, processing unit, processing module or controller, by a single shared computer, processor, processing unit, processing module or controller, or by a plurality of individual computers, processors, processing units, processing modules or controllers, some of which may be shared or distributed. Moreover, these terms also refer to other hardware capable of performing such functions and/or executing software, such as the example hardware recited above.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method in a user equipment for attaching the user equipment to a network slice of a mobile communications network, the method comprising:
   receiving a set of network slice identities, each network slice identity of the set of network slice identities is associated with a respective network slice of the mobile communications network and each said network slice identity is associated with functional capabilities of the associated network slice;
   selecting, based on one or more criteria and an anchoring application running on the user equipment, a network slice identity from the set of network slice identities;
   sending, to a network node, a request for requesting establishment of a network slice for the user equipment, wherein
      the request comprises the selected network slice identity, and
      the selected network slice identity is associated with a network operator and comprises a network slice type;
   receiving, from the network node, a temporary user equipment identity obtained from a mobile virtual network operator (MVNO) and an authentication access point for use by the anchoring application running on the user equipment for performing initial authentication;
   displaying an authentication window for input of authentication information by a user of the user equipment;
   sending, by the anchoring application running on the user equipment, an authentication request to the MVNO, wherein the authentication request includes the temporary user equipment identity and the authentication information input by the user;
   receiving, from the MVNO, a base network slice application anchoring point to the anchoring application running on the user equipment; and
   anchoring, by the anchoring application, the user equipment to a base network slice, wherein all traffic is routed to and from the base network slice based on the anchoring.

2. The method of claim 1, wherein the step of receiving the set of network slice identities comprises receiving a message that comprises the set of network slice identities and that further comprises a set of network slice capability tags associated with respective network slice identities, wherein each network slice capability tag included in the set of network slice capability tags relates to functional capabilities of the associated portion of the mobile communications network.

3. The method of claim 1, wherein the step of selecting is based on one or more criteria including:
   a user preference;
   a network slice type preferred by a mobile network operator, MNO, for a particular service or application to be used by the user equipment;
   a network slice type preferred by a mobile network operator, MNO, for one or more services or applications to which the user equipment is subscribed;
   a network slice type preferred by a mobile virtual network operator, MVNO, for a particular service or application to be used by the user equipment;
   a network slice type preferred by a mobile virtual network operator, MVNO, for one or more services or applications to which the user equipment is subscribed; or
   a degree of correlation between capabilities of an application or service to be used by the user equipment and capabilities of the network slice of the network.

4. The method of claim 3, wherein the network slice type relates to a service type, user equipment type, or a business criterion.

5. The method of claim 1, wherein
   the anchoring application is preloaded onto the user equipment, or loaded onto the user equipment by the user of the user equipment.

6. The method of claim 1, wherein the selected network slice identity comprises a slice type identity (SLI) that identifies a type of network slice associated with a network operator identity identifying the network operator providing the selected network slice.

7. The method of claim 6, further comprising pre-registering the user equipment with the network node to inform the network node that the user equipment wishes to receive the set of network slice identities.

8. The method of claim 1, further comprising the step of attaching one or more other applications or services to the selected network slice.

9. The method of claim 8, wherein attaching one or more other applications or services to the network slice comprises associating a secondary network slice with the initially selected network slice.

10. The method of claim 1, wherein the set of network slice identities is received from the network node.

11. A method in a network node for attaching a user equipment to a mobile communications network, the method comprising:
  advertising a list of network slice identities, each network slice identity of the list of network slice identities is associated with a respective network slice of the mobile communications network and each said network slice identity is associated with functional capabilities of the associated network slice;
  receiving, from the user equipment, a request requesting establishment of a network slice for the user equipment, wherein
    the received request comprises a network slice identity,
    the network slice identity is selected by the user equipment based on one or more criteria and an anchoring application running on the user equipment, and
    the network slice identity is associated with a network operator and comprises a network slice type; and
  sending, to the user equipment, a temporary user equipment identity obtained from a mobile virtual network operator (MVNO) and an authentication access point for use by the anchoring application running on the user equipment for performing initial authentication, wherein
    the anchoring application running on the user equipment sends an authentication request to the MVNO,
    the authentication request includes the temporary user equipment identity and authentication information input by a user on an authentication window displayed on the user equipment,
    the user equipment receives from the MVNO a base network slice application anchoring point to the anchoring application running on the user equipment,
    the user equipment is anchored to a base network slice by the anchoring application, and
    all traffic is routed to and from the base network slice based on the anchoring.

12. The method of claim 11, wherein, prior to the step of receiving the request, the method comprises:
  receiving a request from the user equipment to register with a mobile network operator (MNO) or the mobile virtual network operator; and
  assigning a global unique user equipment identity to the user equipment, and a default network slice identity of a network slice that the user equipment can use.

13. The method of claim 11, further comprising:
  selecting a network node based on the network slice identity.

14. A user equipment for attaching to a mobile communications network, the user equipment comprising:
  a transmitter;
  a receiver operable to receive a set of network slice identities, each network slice identity of the set of network slice identities is associated with a respective network slice of the mobile communications network and each said network slice identity is associated with functional capabilities of the associated network slice;
  a processor; and
  a memory, said memory containing instructions executable by said processor, wherein said user equipment is operative to:
  select, based on one or more criteria and an anchoring application running on the user equipment, a network slice identity from a received set of network slice identities;
  employ the transmitter to transmit, to a network node, a request for requesting establishment of a network slice for the user equipment, wherein
    the request comprises the selected network slice identity, and
    the selected network slice identity is associated with a network operator and comprises a network slice type;
  employ the receiver to receive, from the network node, a temporary user equipment identity obtained from a mobile virtual network operator (MVNO) and an authentication access point for use by the anchoring application running on the user equipment for performing initial authentication;
  display an authentication window for input of authentication information by a user of the user equipment;
  employ the transmitter to transmit, by the anchoring application running on the user equipment, an authentication request to the MVNO, wherein the authentication request includes the temporary user equipment identity and security information input by the user;
  employ the receiver to receive, from the MVNO, a base network slice application anchoring point to the anchoring application running on the user equipment; and
  anchor, by the anchoring application, the user equipment to a base network slice, wherein all traffic is routed to and from the base network slice based on the anchoring.

15. A network node for attaching a user equipment to a mobile communications network, the network node comprising:
  a transmitter;
  a receiver;
  a processor; and
  a memory, said memory containing instructions executable by said processor, wherein said network node is operative to:
  employ the transmitter to advertise a list of network slice identities, each network slice identity of the list of network slice identities is associated with a respective network slice of the mobile communications network and each said network slice identity is associated with functional capabilities of the associated network slice; and
  employ the receiver to receive, from the user equipment, a request requesting establishment of a network slice for the user equipment, wherein
    the received request comprises a network slice identity,
    the network slice identity is selected by the user equipment based on one or more criteria and an anchoring application running on the user equipment, and the network slice identity is associated with a network operator and comprises a network slice type;
employ the transmitter to transmit, to the user equipment, a temporary user equipment identity obtained from a mobile virtual network operator (MVNO) and an authentication access point for use by the anchoring application running on the user equipment for performing initial authentication, wherein
the anchoring application running on the user equipment sends an authentication request to the MVNO,
the authentication request includes the temporary user equipment identity and authentication information input by a user on an authentication window displayed on the user equipment,
the user equipment receives from the MVNO a base network slice application anchoring point to the anchoring application running on the user equipment,
the user equipment is anchored to a base network slice by the anchoring application, and
all traffic is routed to and from the base network slice based on the anchoring.

* * * * *